United States Patent
Biggs et al.

(10) Patent No.: US 6,564,066 B1
(45) Date of Patent: May 13, 2003

(54) METHOD FOR SITE-BASED PRIORITY IN A COMMUNICATION SYSTEM

(75) Inventors: Robert A. Biggs, Evanston, IL (US); John M. Gilbert, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/572,818

(22) Filed: May 17, 2000

(51) Int. Cl.[7] .................................................. H04B 7/00
(52) U.S. Cl. ...................... 455/512; 455/518; 455/519; 455/520
(58) Field of Search .................................. 455/512, 518, 455/519, 520, 521, 527

(56) References Cited

U.S. PATENT DOCUMENTS 5,101,502 A * 3/1992 Felderman et al. ......... 455/527
5,371,780 A * 12/1994 Amitay ....................... 455/512
5,659,881 A * 8/1997 Kent ........................... 455/520

* cited by examiner

Primary Examiner—Thanh Cong Le
Assistant Examiner—Lana Le
(74) Attorney, Agent, or Firm—Susan L. Lukasik; Frank J. Bogacz

(57) ABSTRACT

Each communication unit (112A through 112F) and talkgroup in a communication system (100) is assigned a priority at each site (106, 108, and 110) in the system. As communication units (112A through 112F) request resources, contention among requesters at a site is resolved by the priority of requesters at the site. System-wide resources are allocated equitably based on the geographical location of the communication unit using site-based priority.

9 Claims, 4 Drawing Sheets

|     | TALKGROUP | SITE 106 | SITE 108 | SITE 110 |
|-----|-----------|----------|----------|----------|
| 210 | 1 | 3 | 4 | 4 |
| 212 | 2 | 9 | 9 | 9 |

200

|     | SUBSCRIBER UNIT | SITE 106 | SITE 108 | SITE 110 |
|-----|-----------------|----------|----------|----------|
| 230 | 112a | 8 | 8 | 8 |
| 232 | 112b | 3 | 4 | 4 |
| 234 | 112c | 3 | 3 | 5 |
| 236 | 112d | 2 | 9 | 9 |
| 238 | 112e | 6 | 4 | 4 |
| 240 | 112f | 9 | 9 | 9 |

METHOD FOR SITE-BASED PRIORITY IN A COMMUNICATION SYSTEM

FIELD OF THE INVENTION

This invention relates to communication systems, including but not limited to a method for allocating resources in a wide-area communication systems such as radio frequency (RF) communication systems.

BACKGROUND OF THE INVENTION

Wide-area dispatch communication systems are known. Commercial examples of such systems include SMART-ZONE™ and OMNILINK™ systems available from Motorola, Inc. In these systems, multiple base sites are geographically distributed over a wide-area to provide over-the-air communications for communication units (e.g., vehicle-mounted or portable communication units in a land mobile system and communication unit/telephones in a cellular system) travelling in the area. The base sites are connected via a communication path to a zone controller that performs call control and mobility management for communication units and talkgroups in the system. Each site provides one or more communication resources, including RF resources such as narrow band frequency modulated communication resources, time division multiplex slots, frequency pairs, and so forth. A zone manager is operably coupled to the zone controller in the system to configure system parameters, physical device configuration, and communication unit, and talkgroup attributes.

In existing wide-area dispatch systems, communication units are grouped for intercommunication. Talkgroups are groupings of communication units that wish to intercommunicate. For example, the fire department of a municipality uses a talkgroup to facilitate communication between all members of the fire department. Similarly, the police department may use another talkgroup to facilitate communication among the members of the police department. Typically, talkgroups are assigned a system-wide priority such that communications between members of a high-priority talkgroup are allocated resources before communications between members of a low-priority talkgroup. With such allocation, resources needed for a call, such as RF communication resources, are more efficiently allocated. In addition, individual communication units are assigned a system-wide priority. A particular user may be assigned a higher priority than other users without regard to the user's talkgroup affiliation. For example, a police chief is likely to be assigned a higher priority than a patrol officer, even though the talkgroup for the police department has one talkgroup priority. The individual communication unit priority assignments are used for individual telephone interconnect or private calls. When communication resources are allocated for talkgroup calls, the higher of the talkgroup priority or requesting communication unit priority is used to allocate resources. For private calls (communication unit to communication unit) the higher of the requesting and target priorities is used to allocate resources. For telephone interconnect calls, the priority of the requesting communication unit is used to allocate resources.

Presently, multiple municipalities may share a single wide-area dispatch communication system. This sharing provides communication between, and facilitates cooperation between, users in different municipalities. For example, the police department of Metropolis A may communicate and provide backup to the police department of neighboring Metropolis B by virtue of a shared communication system. In addition, shared resources and administration of the communication system provide cost efficiency.

Although benefits and efficiencies of sharing wide-area dispatch communication systems between multiple governmental bodies and a diversity of users exist, difficulties with such a system may be present. In particular, when there are limited resources, contention for system resources occurs. The existing priority scheme for allocating resources is not sufficient for diversified and shared use of wide-area dispatch communication systems. For example, a police officer who lives in Metropolis A and works in Metropolis B, travels into Metropolis A on his way home from a shift. Metropolis A and Metropolis B share a wide-area communication system. Because the police officer has a relatively high talkgroup priority associated with Metropolis B, where he works, this high priority travels with him to Metropolis A, where he lives, because priorities are typically assigned on a system-wide basis. Although the police officer's high priority in Metropolis B is quite desirable, the officer's relatively high priority in Metropolis A may not be so desirable.

One known solution for allocating resources based on the geographical location of the communication unit is to segment the communication system. Segmentation prevents a user from utilizing a site in a particular geographical region. This solution does allocate resources geographically, but isolates some users in certain geographical locations, which isolation may be detrimental. A similar solution allocates select resources at a site for particular communication units or talkgroups. For example, the police officer in the example above is allowed to use only certain communication resources in Metropolis A, with the other communication resources are dedicated for use by persons working in Metropolis A. This solution reduces the total number of communication resources available to Metropolis A and generally requires more communication resources at every site. These solutions are not adequate for efficiently providing a priority for users based on the geographical location of the user.

Accordingly, a need exists for a method of allocating resources to communication units in a communication system based on the geographical location of the communication unit.

BRIEF DESCRIPTION OF THE DRAWINGS

FIG. 2 is a diagram illustrating an exemplary assignment of priority for communication units in accordance with the present invention.

DESCRIPTION OF A PREFERRED EMBODIMENT

The following describes a communication system that includes a plurality of communication units and a plurality of sites that are geographically disbursed. Each communication unit is assigned a priority for each site in the system.

Similarly, talkgroups on the communication system are each assigned a priority for each site associated with the system. As requests are received from communication units, communication resources and the like, are allocated based on the talkgroup and communication unit priorities at the particular site providing resources. In this manner, communication units and talkgroups have varying priorities based on the site at which resources are requested.

Figure 1:
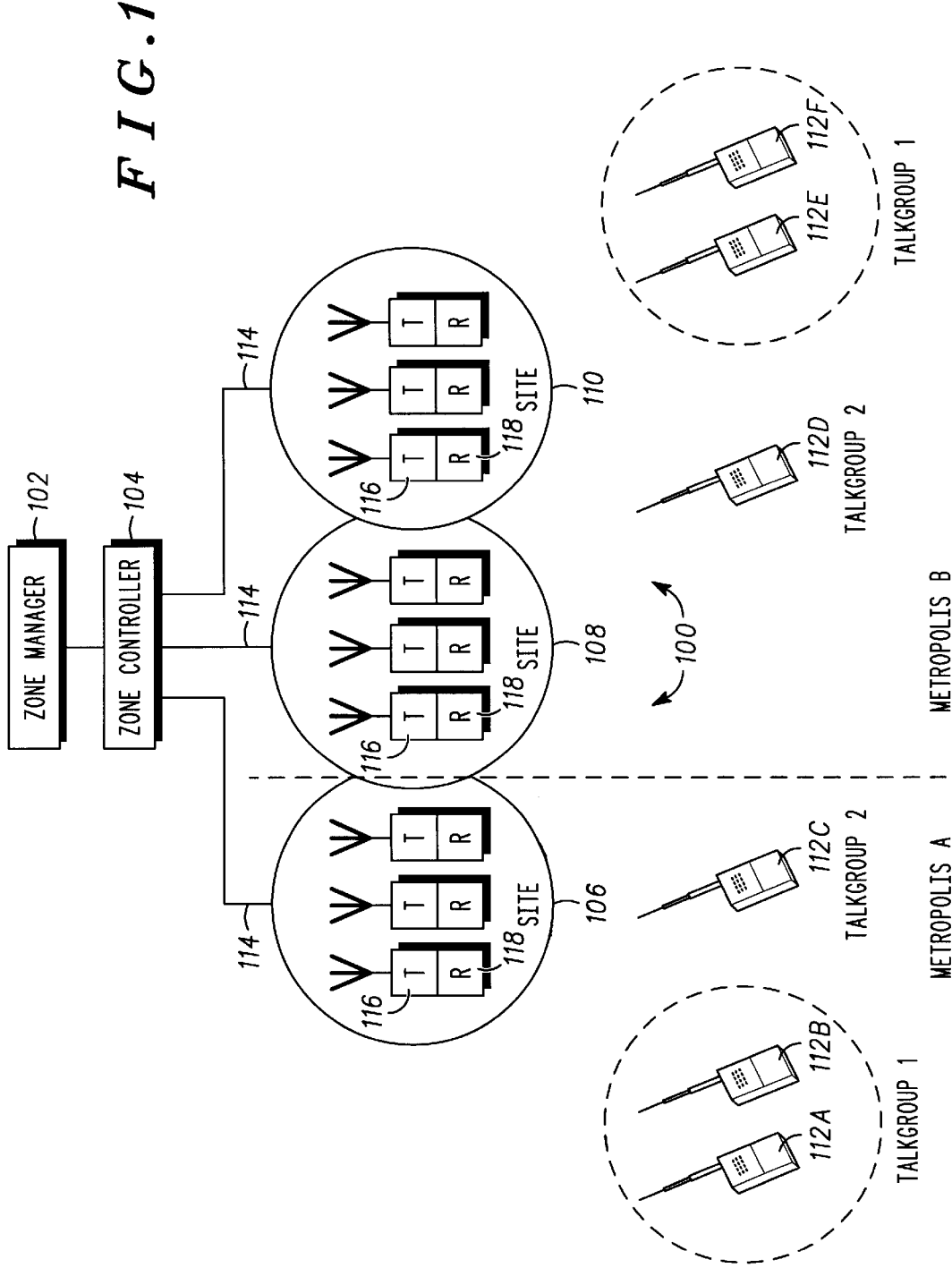
FIG. 1 is a block diagram of a communication system with site-based priority in accordance with the present invention.

FIG. 1 is a block diagram of a communication system 100 in accordance with the present invention. In the preferred embodiment, the system 100 is a radio frequency communication system that includes a zone manager 102, a zone controller 104, base sites 106, 108, and 110, and a plurality of communication units 112A through 112F. In the preferred embodiment, the zone manager 102 configures system parameters, physical device configuration, and communication unit and talkgroup attributes, including priorities. In the preferred embodiment, the zone controller 104 performs call control and mobility management for communication units and talkgroups on the system. The zone manager 102 is operably coupled to the zone controller 104 for communication of configuration and control information between the two. In the preferred embodiment, the zone controller 104 is operably coupled to a plurality of the sites 106, 108, and 110 via communication links 114. In accordance with the present invention, the zone manager 102 and the zone controller 104 store a priority for communication units 112A through 112F and talkgroups on the system 100. The communication unit priorities and talkgroup priorities are allocated on a per site basis. That is, each communication unit and each talkgroup has a predetermined priority on the first site 106, another priority on the second site 108, and another priority on the third site 110. The site-based priorities are used to allocate communication resources on the system, such as RF channels, for calls.

In the preferred embodiment, the zone manager 102 is a processor-based apparatus that is responsible for configuring system parameters such as physical device configuration parameters and communication unit and talkgroup attributes. In the preferred embodiment, the zone manager 102 includes an interface for a user or system manager to monitor and configure the system. For example, a system manager may input a priority for each communication unit and talkgroup for each site in the system. The zone manager 102 communicates the priority data to the zone controller 104.

In the preferred embodiment, the zone controller 104 is a processor-based communications controller that performs call control and mobility management for communication units and talkgroups on the system. The zone controller 104 stores the priority data for communication units and talkgroups for each site and utilizes the priority data in assigning system resources.

The sites 106, 108, and 110 provide an over-the-air interface to communication units 112A through 112F. The sites 106, 108, and 110 include transmitters 116 and receivers 118 for over-the-air communication with communication units 112A through 112F. The sites 106, 108, and 110 are preferably geographically disbursed. Although three sites are shown in FIG. 1, the present invention may be successfully practiced with any number of sites. In some cases, the system 100 covers a statewide area. In FIG. 1, the first site 106 is shown located in a municipality designated Metropolis A. Other sites 108 and 110 are shown located in a municipality designated Metropolis B. Metropolis A and Metropolis B are adjacent municipalities. Communication units 112A through 112F are units that provide voice/audio and/or data communications. Communication units 112A through 112F travel throughout the geographical area covered by the system 100. Typically, communication units 112A through 112F register at a site, such as the sites 106, 108, and 110 shown, for communication via the site.

In the preferred embodiment, the communication units 112A through 112F are capable of making individual calls on the system from one communication unit to another communication unit; talkgroup calls that are broadcast to all communication units associated with a talkgroup; and/or telephone interconnect calls that require the zone controller 104 to interconnect the call with the public-switched telephone network through an interface (not shown). As an exemplary grouping, in FIG.1, communication units 112A, 112B, 112E, and 112F are shown affiliated with talkgroup 1. Communication units 112C and 112D are associated with talkgroup 2. In the exemplary system shown in FIG. 1, members of talkgroup 1 and talkgroup 2 are located in Metropolis A and Metropolis B. In accordance with the present invention, communication units 112A through 112F, whether making individual calls or talkgroup calls, obtain access to the system 100 call resources based on a site-specific priority.

FIG. 2 illustrates exemplary priorities assigned to the talkgroups and communication units shown in FIG. 1. For the purpose of explanation, the priorities shown in FIG. 2 range from 2 through 9, with 9 representing the highest priority and 2 representing the lowest priority. Any other designation for priority is alternatively used.

Table 200 of FIG. 2 shows exemplary priorities assigned to talkgroup 1 and talkgroup 2. In particular, the first column 202 lists the particular talkgroup; the second column 204 lists the priority associated with the first site 106; the third column 206 lists the priority associated with the second site 108; and the fourth column 208 lists the priority associated with the third site 110. The first row 210 gives the priorities for the associated sites for talkgroup 1 and the second row 212 gives the priorities for each site for talkgroup 2. A priority is given for each talkgroup at each site. This configuration is in contrast to the prior art, which permitted only a single priority for each talkgroup and communication unit and required the priority to be consistent across sites in the system. The exemplary priorities assigned in table 200 nominally give talkgroup 1 a higher priority in Metropolis B than in Metropolis A, based on the location of the sites 106, 108, and 110.

Table 220 of FIG. 2 lists exemplary priorities for communication units 112A through 112F across each of the sites 106, 108, and 110. In particular, the first column 222 lists the particular communication unit; the second column 224 lists the priority for the first site 106; the third column 226 lists the priority for the second site 108; and the fourth column 228 lists the priority for the third site 110. The first row 230 lists the priorities associated with communication unit 112A; the second row 232 lists the priorities associated with communication unit 112B; the third row 234 lists the priorities associated with communication unit 112C; and the remaining rows 236, 238 and 240 list the priorities associated with communication units 112D, 112E, and 112F, respectively. In contrast to the prior art, each communication unit 112A through 112F has a priority for each site in the system. For example, communication unit 112C has a priority of "3" at the first site 106, a priority of "3" at the second site 108, and a higher priority of "5" at the third site 110.

The site-based priorities for talkgroups and individual communication units are configured in the system 100 using the zone manager 102. The priorities are stored by the zone controller 104 and used by the zone controller 104 in assigning call resources. Additional site-based priorities are alternatively assigned based on the type of service requested. For example, a communication unit may have one priority for communication unit to communication unit calls at one site and a different priority for communication unit to telephone calls on the same site.

Figure 3:
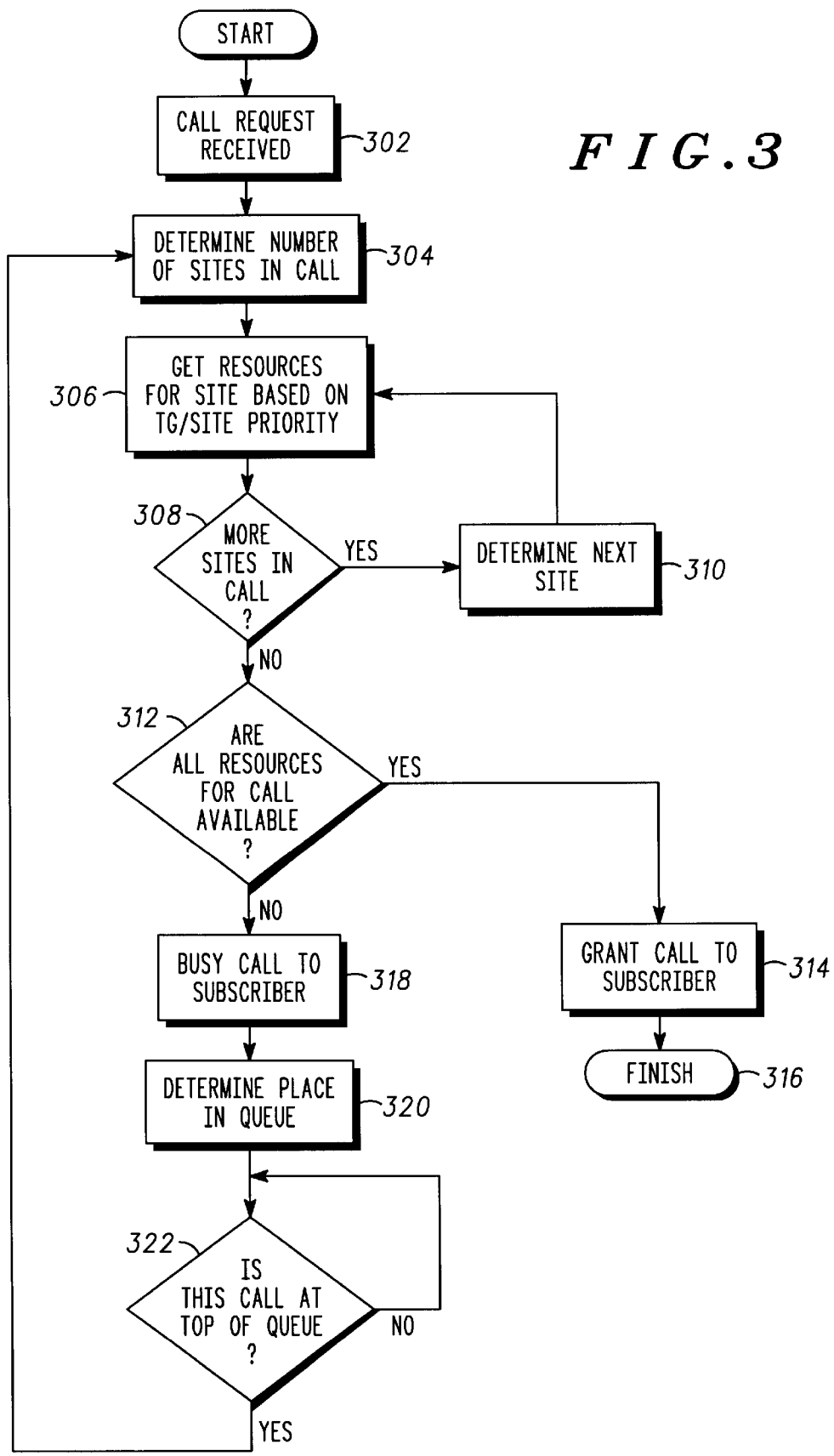
FIG. 3 is a flowchart illustrating a method for allocating resources in a communication system in accordance with the present invention.

FIG. 3 is a flowchart illustrating a method for assigning resources in the system 100 based on the site-based priorities for talkgroups and communication units. A call request is received 302 by the system 100. The call request is made from a communication unit 112A through 112F. The request is alternatively for a communication unit to communication unit call; a communication unit to telephone interconnect call; or a talkgroup call. Of course, other calls are contemplated as well.

Based on the request, and the location of communication units that will be involved in the call, the number of sites involved in the call is determined 304. If communication unit 112A is registered to the first site 106 and communication unit 112F is registered at the third site 110, then a communication unit to communication unit call between communication unit 112A and communication unit 112F involves both sites 106 and 110. Therefore, communication resources must be allocated at both sites 106 and 110 to establish the call at each of these sites. If the call is a talkgroup call, then the sites 106, 108 and 110 may be involved in the call if talkgroup members are registered at those sites.

Resources at the site where the call is requested are allocated 306. For a voice/audio call, for example, communication resources must be allocated and set up for the transmission and reception of voice/audio at a site. Additional resources include encryption/decryption resources, voice/audio logging, console operator positions, intersystem voice/audio channels, and external voice/audio interfaces. In the preferred embodiment, the zone controller 104 controls the allocation of resources in the system 100. Resources are allocated, if available, at all sites involved in a call, as illustrated in steps 306, 308, and 310.

When determining whether resources are available for a call, there may be contention for some resources. For example, multiple communication units may request call resources at the same time. In the prior art, the system-wide priority assigned to either the individual communication unit or the talkgroup determines how resources are allocated in the case of contention. In accordance with the present invention, contention for a resource is determined on a site-by-site basis considering the priority for the communication unit and/or talkgroup at the particular site.

Figure 4:
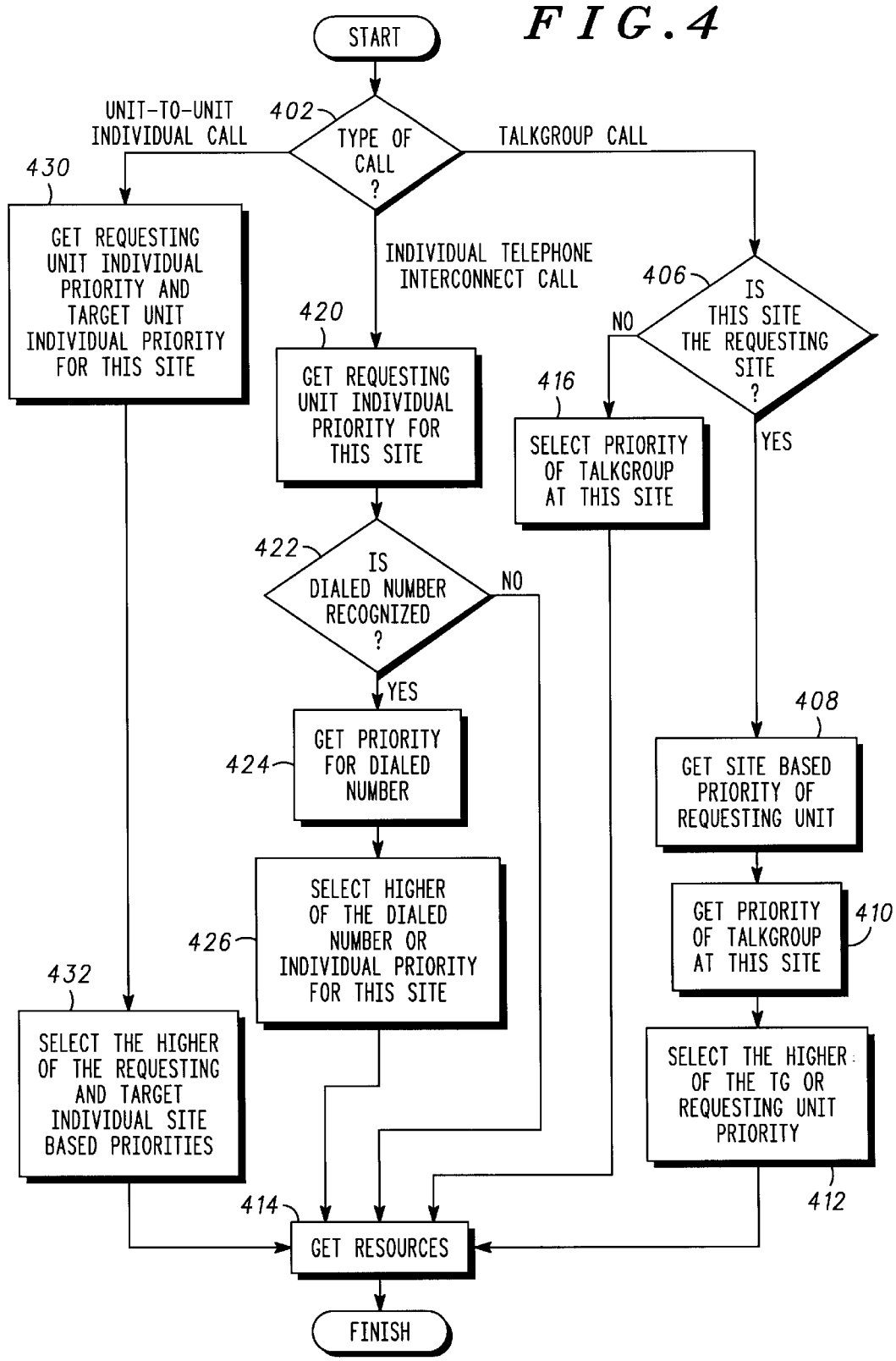
FIG. 4 is a flowchart illustrating a method for selecting priorities for allocating resources in accordance with the present invention.

FIG. 4 illustrates a method for resolving contention for resources using site-based priority in accordance with the present invention. Since the priority for resources is determined in part based on the type of call, the type of call requested is determined 402. As discussed above, the call may be a talkgroup call, a telephone interconnect call or a communication unit to communication unit call. For a talkgroup call, whether the site is the requesting site is determined 406. In other words, is the site allocating resources the same site that received the request for the call. If the allocating site is the requesting site, then the individual priority for the requesting communication unit at that site is determined 408 and the site-based talkgroup priority for the talkgroup associated with the talkgroup call is determined 410. Then the higher of the individual requesting unit site-based priority or the talkgroup site-based priority 412 is used to obtain resources 414 and resolve contention. On the other hand, if the site allocating resources is not the requesting site 406, then the priority of the talkgroup at the site 416 is used to obtain resources 414 and resolve contention.

For a telephone interconnect call, the requesting units' individual site-based priority is obtained 420. Then the telephone number the unit desires to connect to, that is, the dialed telephone number, is examined to determine if the dialed number is recognized by the system 422. Certain telephone numbers are preferably assigned a priority for obtaining system resources. For example, emergency 911 calls or non emergency police calls are assigned a high priority in the system. Only a portion of the dialed number is alternatively used. If the dialed number or relevant portion thereof is recognized by the system, then the priority associated with the dialed number is obtained 424. Then the higher of the site-based priority associated with the dialed number or the individual communication units' site-based priority 426 is used to obtain resources 414 and resolve contention. If, on the other hand, the dialed number is not recognized by the system as having a site-based priority associated therewith 422, then the individual communication units' site-based priority is used to obtain resources 414 and resolve contention.

For unit-to-unit individual calls, the requesting units' individual site-based priority and the target units' individual site-based priority are determined 430. Then the higher of the requesting units' site-based priority or the target units' site-based priority 432 is used to obtain resources 414 and resolve contention.

For example, with reference to FIG. 1 and FIG. 2, if two communication units 112A and 112C, which are both registered at the first site 106, contend for call resources on the first site 106 for individual communication unit (not talkgroup) calls, then, assuming the target unit's priorities are lower than the requesting unit's priorities, communication unit 112A is allocated the resource in light of its higher priority of "8" versus a priority of "3" for communication unit 112C. On the other hand, if while registered at the first site 106, communication units 112A and 112C request talkgroup calls (for talkgroup 1 and talkgroup 2, respectively) and contend for call resources, communication unit 112C is allocated the call resources based on its higher talkgroup priority of "9" versus a talkgroup priority of "3" for talkgroup 1, an individual priority of "3" for communication unit 112C, or an individual priority of "8" for communication unit 112A. As resources are allocated at each site, the priorities associated with the site are used to resolve contention.

Returning to FIG. 3, the zone controller 104 attempts to obtain resources at each site to be involved in a call 304, 306, 308. If all resources necessary for the call are available 310, then the call request is granted 312 and the call proceeds in the normal manner. If at step 310 all resources cannot be allocated due to unavailability of a resource, then the communication unit receives a busy indication 316, and the call request is placed in a queue 318. In the preferred embodiment, requests are placed on the queue based on the priorities determined according to the method of FIG. 4.

As calls are processed and resources released, the queue is serviced from the top 320 with an attempt to obtain resources by repeating steps of the method beginning with step 302.

The present invention provides for site-based priorities in a wide area communication system. This site-based priority advantageously allows for an allocation of resources on a site-by-site basis. In this manner, resources are efficiently controlled, for example, between multiple municipalities and diverse organizations sharing a wide area dispatch communication system. Site-based priorities allow multiple entities, such as governmental bodies and a diversity of users, to share a communication system equitably and efficiently.

Whereas the present invention has been described with respect to specific embodiments thereof, it will be understood that various changes and modifications will be suggested to one skilled in the art and it is intended that the invention encompass such changes and modifications as fall within the scope of the appended claims. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for allocating resources in a communication system comprising the steps of:
   assigning a first communication unit priority for a first communication unit at a first site in the communication system;
   assigning a second communication unit priority for the first communication unit at a second site in the communication system, wherein the second communication unit priority is capable of being different from the first communication unit priority;
   allocating a first set of resources at the first site based on the first communication unit priority;
   allocating a second set of resources at the second site based on the second communication unit priority;
   assigning a third communication unit priority for a second communication unit at the first site; and
   allocating a third set of resources at the first site for a unit-to-unit call between the first communication unit and the second communication unit based on a higher one of the first communication unit priority and the third communication unit priority.

2. The method of claim 1, wherein the method is performed by a communications controller.

3. A method for allocating resources in a communication system comprising the steps of:
   assigning a first communication unit priority for a first communication unit at a first site in the communication system;
   assigning a second communication unit priority for the first communication unit at a second site in the communication system, wherein the second communication unit priority is capable of being different from the first communication unit priority;
   allocating a first set of resources at the first site based on the first communication unit priority;
   allocating a second set of resources at the second site based on the second communication unit priority; and
   allocating a third set of resources at the first site for a telephone interconnect call with the first communication unit based on a higher one of the first communication unit priority and a dialed number priority assigned to a telephone number associated with the telephone interconnect call.

4. A method for allocating resources in a communication system comprising the steps of:
   assigning a first communication unit priority for a first communication unit at a first site in the communication system;
   assigning a dialed number priority for a telephone number at the first site; and
   allocating a first set of resources at the first site for a telephone interconnect call between the first communication unit and the telephone number based on a higher one of the first communication unit priority and the dialed number priority.

5. The method of claim 4 wherein the method is performed by a communications controller.

6. A method for allocating resources in a communication system comprising the steps of:
   assigning a first communication unit priority for a first communication unit at a first site in the communication system;
   assigning a second communication unit priority for the first communication unit at a second site in the communication system, wherein the second communication unit priority is capable of being different from the first communication unit priority;
   assigning a first group priority for a first group at the first site in the communication system;
   assigning a second group priority for the first group at the second site in the communication system, wherein the second group priority is capable of being different from the first group priority; and
   allocating a first set of resources at the first site for a group call to the first group from the first communication unit based on a higher one of the first communication unit priority and the first group priority.

7. The method of claim 6, wherein the first communication unit is registered at the first site.

8. The method of claim 7, further comprising the step of allocating a second set of resources at the second site based the second group priority.

9. The method of claim 6, wherein the method is performed by a communications controller.

* * * * *